United States Patent [19]

Meyer

[11] Patent Number: 4,578,995

[45] Date of Patent: Apr. 1, 1986

[54] RAIN SENSOR

[76] Inventor: Hanno H. Meyer, 25219 Coulston St., San Bernardino, Calif. 92408

[21] Appl. No.: 611,723

[22] Filed: May 18, 1984

[51] Int. Cl.⁴ .......................................... G01W 1/14
[52] U.S. Cl. ...................................... 73/171; 73/73; 318/652
[58] Field of Search .................... 73/171, 73; 318/652, 318/651

[56] References Cited

U.S. PATENT DOCUMENTS

| 1,236,381 | 8/1917 | Rogers | 73/171 |
| 2,176,886 | 10/1939 | Campbell | 73/171 |
| 2,740,293 | 4/1956 | Brady | 73/171 |
| 2,743,429 | 4/1956 | Erdman et al. | 318/652 |
| 2,968,688 | 1/1961 | Skinner | 429/8 |
| 3,141,330 | 7/1964 | Murray et al. | 73/171 X |
| 3,186,224 | 6/1965 | Mair | 73/171 X |
| 3,588,659 | 6/1971 | Rogers | 318/651 X |

FOREIGN PATENT DOCUMENTS

| 0493747 | 2/1976 | U.S.S.R. | 73/171 |
| 0591786 | 1/1978 | U.S.S.R. | 73/171 |

Primary Examiner—Daniel M. Yasich
Attorney, Agent, or Firm—Harvey S. Hertz

[57] ABSTRACT

A rain sensor includes a pair of spaced apart parallel conductive rods. The conductive rods are mounted in an insulated housing. The housing includes a pair of angled top wall members which are spaced apart to define a slot, the slot being in an area directly above and parallel to the electrodes. Moisture falling on the housing top wall is collected and directed to the area between the conductive rods.

2 Claims, 5 Drawing Figures

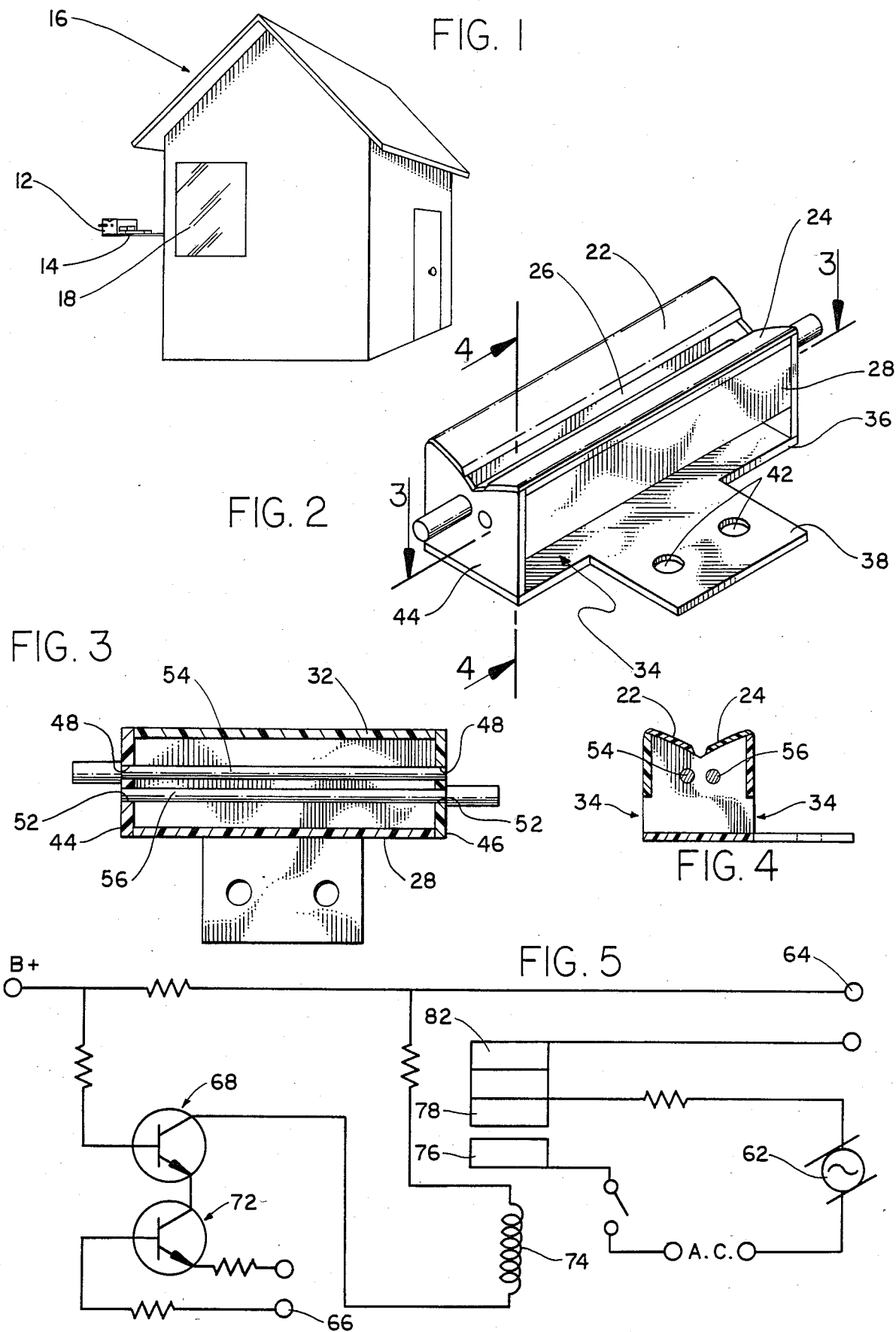

RAIN SENSOR

BACKGROUND OF THE INVENTION (1) Field of the Invention

The invention relates in general to rain sensors, and more particularly, to a pair of conductive rods mounted in a housing for completing an electrical circuit when a fluid is placed between the conductive rods.

(2) Description of the Prior Art

In U.S. Pat. No. 2,968,688, there is illustrated a rain sensor formed of a pair of metallic members which are spaced apart by an insulating member located between the metallic members. When a drop of water falls on the rain sensor, an electrical circuit is completed between the metallic members.

The aforementioned rain sensor has been found to malfunction when dirt or moisture placed between the metallic members also completes the electrical circuit, thus giving a false indication of rain.

The manner in which the invention addresses the disadvantages of the prior art to provide a novel and highly advantageous rain sensor will be understood as the description proceeds.

SUMMARY OF THE INVENTION

A rain sensor comprising a pair of spaced apart parallel conductive rods. The conductive rods are mounted in a housing. The housing includes a pair of angled top wall members spaced apart to define a slot. The slot is in an area directly above and parallel to the electrodes enabling moisture falling on the housing top wall to be directed to the area between the electrodes.

The advantages of this invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is a perspective view illustrating the mounting of the rain sensor;

FIG. 2 is a perspective view of the rain sensor;

FIG. 3 is a cross-sectional view of the rain sensor taken along the line 3—3 of FIG. 2;

FIG. 4 is a cross-sectional view of the rain sensor taken along the line 4—4 of FIG. 2; and FIG. 5 is an electrical circuit illustrating an electrical circuit which could be used with the rain sensor of FIG. 2 to control a motor or other element.

DESCRIPTION OF THE PREFERRED EMBODIMENTS

Referring now to the drawings, there is shown in FIG. 1, a typical mounting arrangement for positioning the rain sensor element 12 of the present invention in a house. As shown in FIG. 1, the rain sensor element is mounted on a ledge 14 which extends beyond the roof line of a house 16 so that should precipitation occur, the sensor element can collect rain. However, it should be understood that other arrangements and mounting positions are possible, the arrangement of FIG. 1 being illustrated primarily to describe the operation of the invention. Should water be detected by the rain sensor element 12, an electrical circuit is completed causing a motor (not shown) to close a window 18 of the house 16. Alternatively, it should be understood that the system could perform other functions such as turning off the automatic sprinkler system in a garden or automatically raising the convertible top of an automobile. In addition, should the precipitation cease, the system can be designed so that the window or other unit being controlled could return to the initial condition or position.

Referring now to FIG. 2, the rain sensor element is shown in greater detail and is formed of a generally rectangular elongated housing which is normally made of molded plastic. The housing top wall is formed of a pair of downwardly extending sections 22 and 24 which are spaced apart along the center line of the sensor element so as to form a slot 26 in the top wall of the sensor element 12. Thus, when the sensor element 12 is mounted on the ledge 14, as shown in FIG. 1, precipitation is accumulated along the sections 22 and 24 and drains towards the slot 26.

The sensor element 12 further comprises a pair of sidewalls 28 and 32 each having a drain aperture 34 formed adjacent to the bottom wall 36 of the rain sensor element enabling water, which passes through the slot 26, to drain from the interior of the rain sensor element 12. In addition, it should be noted that a mounting flange 38 extends from, and is integral with, the housing bottom wall 36. Typically, the mounting flange 38 may have a pair of openings 42 formed therein for enabling the flange 38 to be secured by screws or bolts (not shown) to a mounting surface such as the ledge 14 of FIG. 1.

The end walls 44 and 46 of the raim sensor element 12 each contain a pair of openings 48 and 52 which are used to support a pair of conductive rods 54 and 56. The conductive rods 54 and 56 are positioned in the interior of the rain sensor element 12. As can be seen in FIGS. 3 and 4, each of the conductive rods are spaced apart a distance slightly less than the width of the slot 26 so that as water passes from the slot 26 into the interior of the housing, water will collect between the conductive rods due to their close spacing. Typically, the rods are approximately 1.5 millimeters apart and are approximately two millimeters in diameter, so that a few drops collected in the slot 26 would be sufficient to form a conductive path between the conductive rods.

As shown in FIG. 4, one end of the rod 54 terminates in the end wall 46, whereas the other end of the rod extends outwardly from the end wall 44. Similarly, conductive rod 56 terminates in end wall 44 and extends beyond end wall 46 at its ends. Electrical connections (not shown) are secured to these end rods to the extending portions of the conductive rods 54 and 56 so as to interconnect the rods to an electrical circuit.

Referring now to FIG. 5, an electrical circuit which could be utilized with the rain sensor element 12 to control a motor 62 or other element is illustrated. The conductive rods 54 and 56 of FIGS. 2-4, (not shown in FIG. 5) are connected to terminals 64 and 66, respectively. When rain water collects between the rods 54 and 56, an electrical circuit is completed between terminals 64 and 66.

Transistor 72 is forward biased into conduction which in turn causes transistor 68 to become conductive. When transistor 68 becomes conductive, a relay 74 in the collector circuit of transistor 68 is energized.

The relay 74 in turn causes a pair of normally open contacts 76 and 78 to close and normally closed contacts 78 and 82 to open. Closure of the contacts 76 and 78 energizes a motor 62 which in turn can be used to close the window 18 of FIG. 1. Alternatively, of course, it should be understood that the closure of contact 76 and 78 could be used to turn off a sprinkler system or operate another electrical device as may be deemed necessary.

I claim:

1. A rain sensor comprising:
 a pair of spaced apart parallel conductive rods;
 a housing for mounting said conductive rods therein; and
 said housing including a pair of angled top wall members spaced apart to define a slot, said slot being in an area directly above, parallel to and spaced from said conductive rods for enabling moisture falling on said housing top wall to be directed to the area between said conductive rods, said conductive rods being spaced apart a distance slightly less than the width of said slot.

2. A rain sensor in accordance with claim 1 wherein said angled top wall members each extend downwardly toward said slot.

* * * * *